Patented Apr. 1, 1952

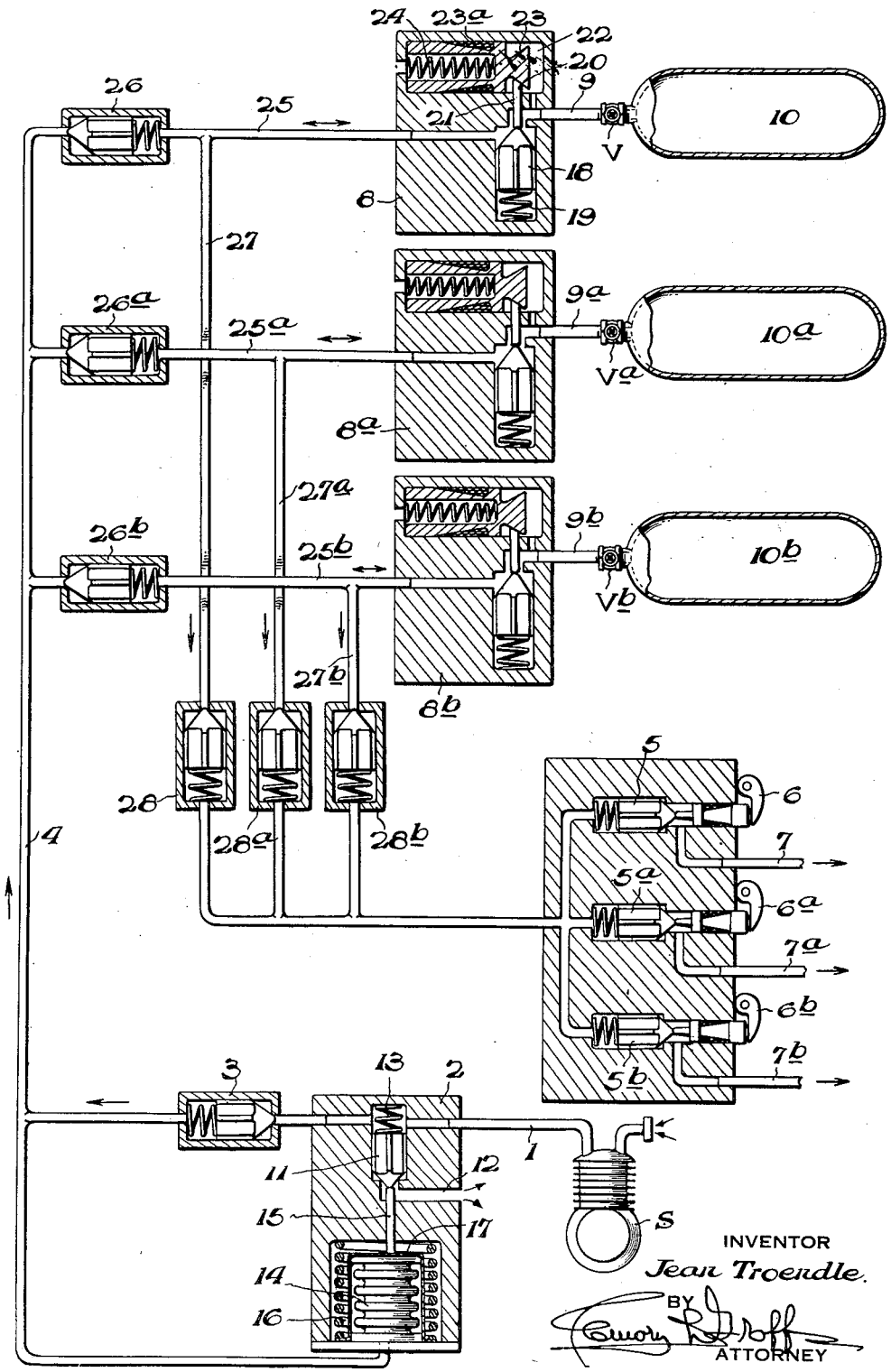

2,591,641

UNITED STATES PATENT OFFICE 2,591,641

PNEUMATIC INSTALLATION

Jean Troendlé, Geneva, Switzerland

Application July 24, 1947, Serial No. 763,273
In Switzerland May 10, 1947

2 Claims. (Cl. 137—78)

The present invention relates to improvements in pneumatic installations comprising one or more sources of compressed air, one or more devices to be fed with compressed air, several compressed air reservoirs and conduits connecting the various elements just described to one another.

Such an installation may be used with great advantages on an aircraft for the pneumatic remote control and actuation of various devices.

In an installation of the type described, the accidental breakage or failure of one of the compressed air reservoirs, or of the line connecting same to the installation, has the consequence that air will escape from the whole installation through the defective member, and, after a period of time depending on the seriousness of the failure the air pressure in the whole system will have dropped to a point where control can no longer be effected throughout the system.

The present invention has for its object an installation laid out in such a manner as to avoid the inconvenience noted above, in that first, on each conduit connecting the reservoirs to the compressed air source or sources, there is provided a safety device automatically shutting off said conduit when the pressure of air contained in the corresponding reservoir has dropped below a predetermined value; second, on each conduit connecting the compressed air source or sources to each reservoir there is interposed a check-valve forbidding air flow from the corresponding reservoir toward said compressed air source or sources; third, on each conduit connecting any reservoir to the devices to be supplied with compressed air there is interposed a check-valve forbidding air flow from said devices to be supplied with compressed air toward said reservoir.

The accompanying drawing shows diagrammatically and by way of example a form of embodiment of the invention.

The figure shows an installation in which an air compressor S takes air from the surrounding atmosphere, compresses it and forces it through conduit 1, connected to a pressure regulator 2, and in turn connected by a check-valve 3 to a general supply line 4. This line 4 feeds the system through check-valves 26, 26a, 26b. Reservoirs 10, 10a and 10b provided each with a hand-operated valve V, Va and Vb, respectively, are fed through safety valves 8, 8a and 8b. Control valves 5, 5a and 5b are fed through check-valves 28, 28a and 28b. These control valves are actuated by control members 6, 6a and 6b for feeding through conduits 7, 7a and 7b the devices (not shown on the drawing) to be controlled or actuated by compressed air.

The pressure regulator 2 comprises a valve 11 enabling communication to be established between conduit 1 and another conduit 12 opening in the free atmosphere. Valve 11 is subjected to the action of a spring 13 tending to press it on its seat. In the opposite direction valve 11 is subjected to the action of the air pressure existing in the general supply line 4, the latter being connected to a deformable chamber 14 with elastic walls. The free end of this deformable chamber actuates a rod 15 which can act on valve 11. In addition, chamber 14 is subjected externally to the action of a spring 16 by the medium of a cap 17 and internally to the air pressure existing within. Adjusting spring 16 determines the maximum pressure to exist in the installation. Check-valve 3 forbids air flow from the general supply line toward the pressure regulator 2, in particular, it prevents compressed air to escape from the system to the free atmosphere through duct 12.

The safety devices 8, 8a and 8b are of the type of shut-off valves described in detail in my patent application No. 770,400, filed August 25, 1947. Each of them comprises a valve 18 interposed between conduits 25 and 9. A spring 19 tends to maintain this valve on its seat which would result in shutting off the communication between these conduits. In the opposite direction the valve 18 is subjected to the action of a rod 20 sliding in a guide 21. A connection exists between conduit 9 and chamber 22 in which a piston 23 can slide under the action of a spring 24. The piston 23 is provided with an air-tight seal 23a. One end of the rod 20 is kept in contact with the valve 18 while the other end contacts an inclined surface provided on the piston 23.

The piston, the valve and the springs are so dimensioned that when the pressure existing in the conduit 9, and therefore in the chamber 22, is lower than a predetermined value, the piston 23 is moved toward the bottom of the chamber 22 (to the right on the figure) under the action of the spring 24. The slope of the inclined surface of the piston 23 in contact with the rod 20 is such that during the motion of the piston, the valve 18 becomes free and is actuated by its spring 19.

It may be seen from the drawing that if conduit 4 is accidentally damaged, check-valves 26, 26a and 26b prevent the loss of compressed air contained in the reservoirs 10, 10a and 10b.

On the other hand, if one or more reservoirs or their individual connection 9, 9a or 9b is damaged and leaks, as soon as the pressure in the corresponding connection has dropped below a predetermined value due to such a failure, the corresponding valve 8, 8a or 8b closes automatically and prevents air contained in the system, that is, air coming either from general supply line 4 or from other intact reservoirs, from escaping into the atmosphere and thereby keeps the installation in service. For putting a new loaded reservoir in operation it is sufficient to screw it in place with its hand-operated valve V, Va or Vb closed. Then, opening said valve will allow air from the reservoir to create in space 22 a pressure sufficient to actuate piston 23 toward the left, which will cause valve 18 to open.

In practice, in order to minimize the risks of leakage, safety valves 8, 8a and 8b, check valves 26, 26a and 26b, 28, 28a and 28b as well as control valves 5, 5a and 5b will be grouped in one single block unit thus avoiding numerous connecting pipes, couplings and fittings.

I claim:

1. In a pneumatic installation the combination comprising at least one source of compressed air, a supply line connected to the source, a plurality of branch conduits connected at one end to the supply line, a check valve in each of the branch conduits, an equal plurality of pairs of second branch conduits, each pair of second branch conduits being connected at one end to one of said first branch conduits, a plurality of reservoirs each connected to the other end of one of a pair of second branch conduits, a plurality of valves each controlling the connection of a second branch conduit to a reservoir and closed by the pressure in the reservoir dropping below a predetermined value, a plurality of second check valves one in the other one of each pair of second branch conduits, and a utilization manifold connected to the other ends of the other ones of the pairs of second branch conduits, and valve means connected to the other ends of the other second branch conduits and operable to supply air therefrom.

2. The combination according to claim 1 and also comprising a pressure regulator in the supply line.

JEAN TROENDLÉ.

REFERENCES CITED

The following references are of record in the file of this patent:

UNITED STATES PATENTS

| Number | Name | Date |
|---|---|---|
| 735,544 | Mann | Aug. 4, 1903 |
| 1,471,800 | Nalley | Oct. 23, 1923 |
| 2,294,396 | Feuchter | Sept. 1, 1942 |
| 2,294,397 | Feuchter | Sept. 1, 1942 |
| 2,306,382 | Fink | Dec. 29, 1942 |
| 2,345,475 | Herman | Mar. 28, 1944 |